J. FIRMENICH.
Making Vinegar.
No. 62,950.
Patented Mar. 19, 1867.
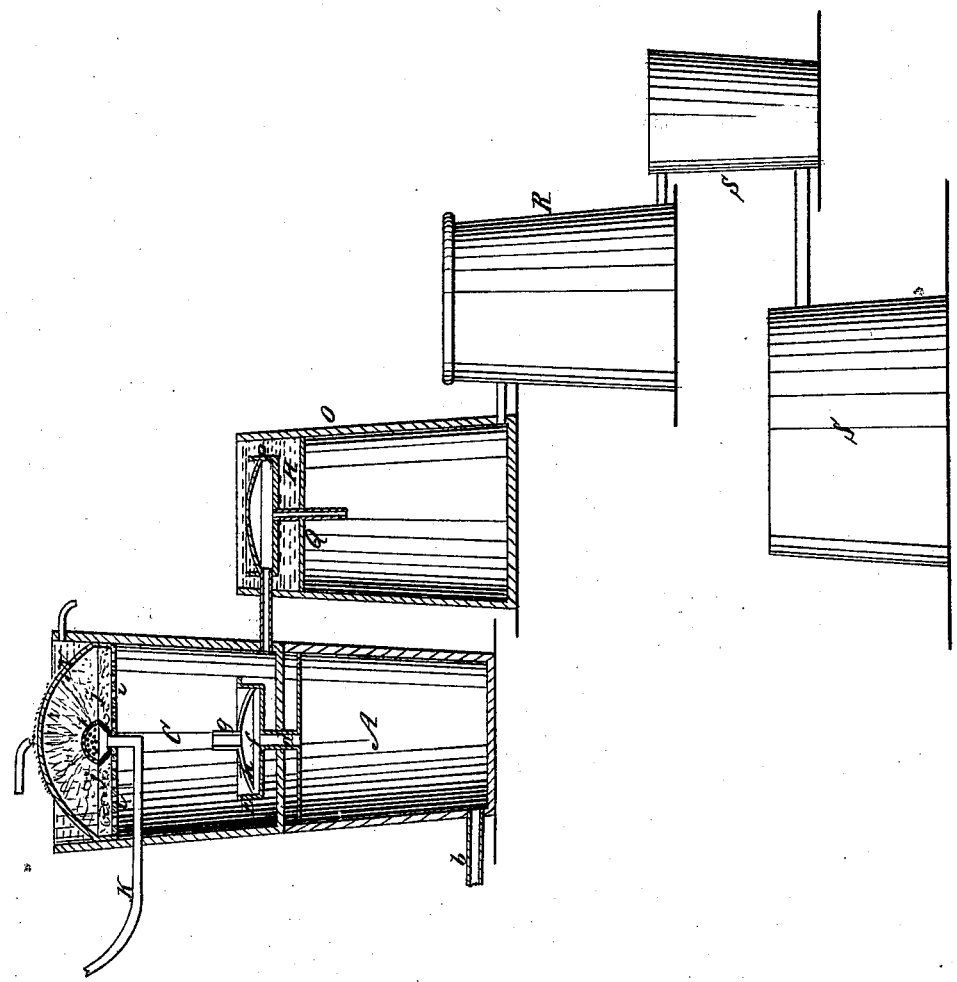
Witnesses:
Inventor:

United States Patent Office.

JOSEPH FIRMENICH, OF BUFFALO, NEW YORK.

Letters Patent No. 62,950, dated March 19, 1867.

---

IMPROVEMENT IN APPARATUS FOR THE MANUFACTURE OF VINEGAR.

---

The Schedule referred to in these Letters Patent and making part of the same.

---

TO ALL WHOM IT MAY CONCERN:

Be it known that I, JOSEPH FIRMENICH, of the city of Buffalo, in the county of Erie, and State of New York, have invented certain new and useful Improvements in Apparatus for the Manufacture of Vinegar; and I do hereby declare that the following is a full and exact description thereof, reference being had to the accompanying drawing, forming part of this specification, which represents a central vertical section of my improved apparatus.

My improvement relates to that part of the process of vinegar making in which alcohol is combined with the wash or wort, forming what is termed the vinegar mixture; and the invention consists in the apparatus hereinafter described, whereby the alcohol, in the form of vapor, is intimately incorporated with the wash, rapidly and thoroughly impregnating the same therewith, as the wash is slowly but continuously run through the apparatus where the combination takes place.

In the drawings, A represents any suitable vessel for holding the mashed grain, or fermented liquor, or other mixture or compound from which alcoholic vapors can be readily evolved, and $b$ is a pipe through which steam is introduced for heating the contents of the vessel and generating the alcoholic vapors. C is the combining vessel, placed preferably on the top of A, with a vapor pipe, $d$, opening from the top of the latter into the upper vessel, whence it passes into the tempering vessel E. This vessel is provided with a double bottom, leaving a space, $f$, between the two for the circulation of the vapor, from whence it escapes through the short pipe $g$, in the upper bottom $h$, up into the main compartment of the vessel C. The sides of the tempering vessel extend a little above the bottom $h$, so as to form a shallow vessel for catching and holding a quantity of the vinegar mixture as it falls thereon, as will be presently described, which partially cools the plate $h$, and which in its turn slightly tempers or reduces the temperature of the alcoholic vapor circulating beneath. Towards the upper portion of the vessel C is a finely-perforated diaphragm, $i$, having a layer of charcoal shavings or other suitable porous material, $j$, resting thereon. Above the whole, and tightly fitting within the vessel, a short distance below its top, is the non-corrosive metallic cover N, made convex or arching, as shown, upon which falls a small stream of cold water, nearly filling the space above, whence it may be conducted off by a suitable pipe to prevent an overflow. K is a pipe leading from the reservoir or tub containing the wort or wash, which may consist of any of the ordinary mixtures employed for the purpose, which passes into the vessel C, and up through the diaphragm and stratum of the porous material $j$, when it terminates in an enlarged and finely-perforated head, $l$, through which the liquid is forced, in the form of spray, up against the under concave surface of the cover N, whence it is showered upon the porous material through which it percolates into the compartment below. The alcoholic vapor, as it is generated in the vessel A, passes up through the pipes and space $d f g$, filling the compartment above, whence it forces its way through the perforated diaphragm and material $j$ into the space above, where it is condensed by the cold surface of N, and the intimate diffusion among and contact with the spray into which the wash is dissipated after it has been forced through the perforated head $l$. The great amount of surface which the interstices in the stratum $j$ exposes to the action of the vapor in its passage through the same, together with the multiplied surface resulting from the diffusion of the acidulated mixture into spray, as before described, brings the vapor into immediate and direct contact with almost every particle of the liquid, with which it becomes incorporated, and which it impregnates in the most complete and intimate manner. After the union takes place, as above described, the vinegar mixture, as it may now be termed, filters through the porous stratum into the space beneath, which is filled with the alcoholic vapor, through which it falls to the bottom of C, a portion being caught by the vessel E for tempering the vapor in its passage through the space $f$. From the bottom of C a pipe conducts it into a cooling vessel, O, in the upper portion of which is a closed pan or vessel, P, the top of which is constructed in a manner similar to the top of vessel E, for retaining a quantity of water, a small stream of which is made to descend upon it, filling the top and the space H beneath the vessel P and above the diaphragm Q. From the centre of the vessel P a pipe opens and descends downwards through its bottom and that of the diaphragm Q into the compartment beneath, through which the now properly cooled mixture flows. The vinegar mixture or wash is now ready for acetification either by the slow or quick method. If the latter process be employed it is run into the acetifying cask R, constructed after any of the approved methods, where, after becoming properly acetified, it may be run into receivers S S, or into barrels, as desired.

The chief advantage of my improvement is the rapid and perfect manner of incorporating the alcoholic principle with the mash or wort, which is so essential in the quick method, where the various processes should be continuously carried on, and which my improvement so greatly facilitates. The tempering vessel E slightly reduces the temperature of the vapor as it passes through, so that it more easily condenses when brought in contact with the liquid which it combines with. The cooling vessel P, especially in warm weather, is an indispensable auxiliary, by which the liquid mixture is readily reduced to the proper temperature for acetification.

What I claim as my invention, and desire to secure by Letters Patent, is—

The combination with the vessel C of the concave condensing surface N, perforated diaphragm $i$, and porous stratum $j$, with the pipe K, provided with perforated head $l$, constructed substantially in the manner and for the purpose set forth.

I also claim, in combination therewith, the tempering vessel E, constructed as described, with the pipe $d$, and vapor generator A, arranged and operating substantially as described.

I also claim the cooling vessel P, constructed as described, in combination with the water space H, arranged and operating as described.

In testimony whereof I have hereunto signed my name in the presence of two subscribing witnesses.

JOS. FIRMENICH.

Witnesses:
J. A. DAVIS,
JAY HYATT.